United States Patent [19]

Sone et al.

[11] Patent Number: 5,694,270

[45] Date of Patent: Dec. 2, 1997

[54] HEAD ASSEMBLY HAVING LAMINATED CONDUCTOR PATTERNS

[75] Inventors: Katsuhide Sone, Kawasaki; Kaoru Abiko, Higashine, both of Japan

[73] Assignee: Fujitsu Limited, Kawasaki, Japan

[21] Appl. No.: 658,892

[22] Filed: May 31, 1996

[30] Foreign Application Priority Data

Jul. 3, 1995 [JP] Japan .................. 7-167694

[51] Int. Cl.$^6$ ...................................... G11B 5/48
[52] U.S. Cl. ...................................... 360/104
[58] Field of Search ...................... 360/104, 106

[56] References Cited

U.S. PATENT DOCUMENTS

| | | | |
|---|---|---|---|
| 4,996,623 | 2/1991 | Erpelding | 360/104 |
| 5,491,597 | 2/1996 | Bennin | 360/104 |
| 5,526,208 | 6/1996 | Hatch | 360/109 |
| 5,539,596 | 7/1996 | Fontana | 360/106 |
| 5,560,097 | 10/1996 | Bajhorek | 29/603.12 |

FOREIGN PATENT DOCUMENTS

| | | |
|---|---|---|
| 57-20961 | 2/1982 | Japan . |
| 60-246015 | 12/1985 | Japan . |
| 27219 | 1/1990 | Japan . |
| 6124558 | 5/1994 | Japan . |

Primary Examiner—A. J. Heinz
Attorney, Agent, or Firm—Greer, Burns & Crain, Ltd.

[57] ABSTRACT

A head assembly which can suppress an increase in electric resistance of plural conductor patterns even when a flexure for mounting a head slider becomes small. The head assembly includes a suspension, a flexure formed integrally with the suspension at a front end portion thereof, and a head slider mounted on the flexure and having a transducer. The head assembly further includes a first conductor pattern formed on the suspension and the flexure and having one end connected to the transducer, and a second conductor pattern laminated on the first conductor pattern with an insulator layer interposed therebetween, and having one end connected to the transducer.

14 Claims, 7 Drawing Sheets

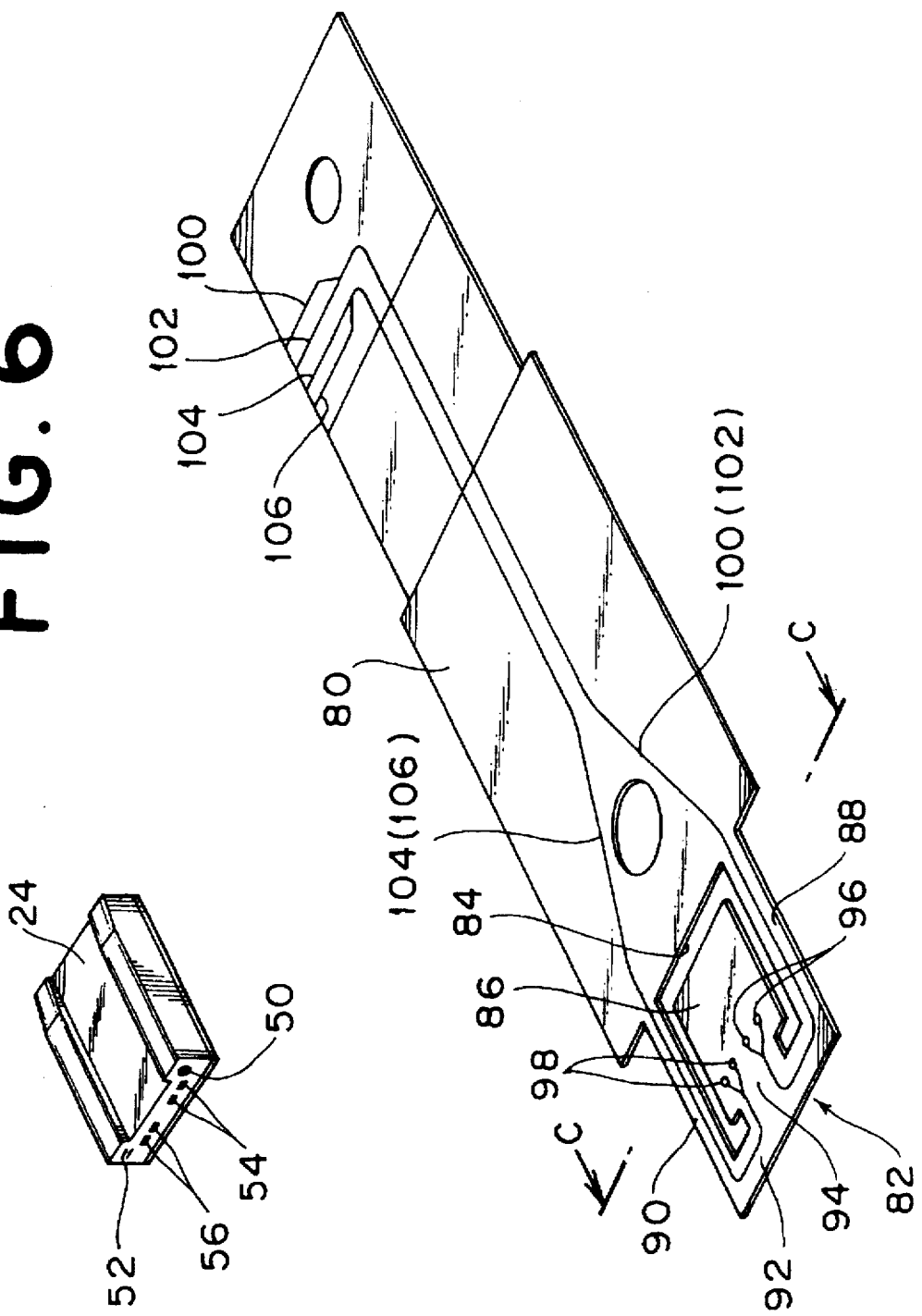

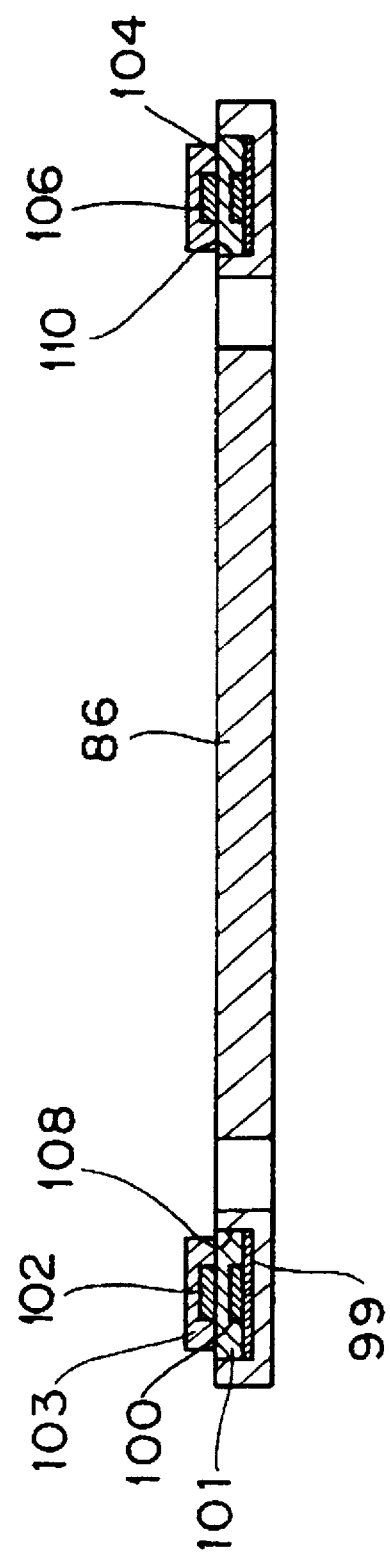

HEAD ASSEMBLY HAVING LAMINATED CONDUCTOR PATTERNS

BACKGROUND OF THE INVENTION

1. Field of the invention

The present invention relates to a head assembly in a magnetic disk drive.

2. Description of the Related Art

In a recent magnetic disk drive as a kind of external storage device for a computer, it has been desired to reduce the size, increase the storage capacity, and reduce the power consumption of the disk drive. To increase the storage capacity, an increase in recording density of a magnetic disk is required and the number of magnetic disks mounted in the disk drive is increasing.

In a magnetic disk drive for a computer, a contact start and stop (CSS) system is generally adopted as the relation between a head and a disk. In this system, the head is kept flying a microscopic height from the disk during rotation of the disk owing to the balance between a flying force generated by air flow due to high-speed rotation of the disk and a pressing force of a suspension for pressing the head on the disk.

When the rotation of the disk is stopped, the head is moved to a contactable zone on the disk and next comes into contact with the disk at the contactable zone. In the rest condition of the disk, the head is kept in contact with the disk. In this system, the distance between a head slider and a magnetic disk has a great influence upon data reading/writing performance.

Conventionally, a transducer formed integrally with the head slider is connected through lead wires to a printed wiring board mounted in a magnetic disk drive, so as to supply a writing data signal to the transducer or transmit a data signal read by the transducer to the printed wiring board. However, with a reduction in size of the magnetic disk drive, the above-mentioned structure of the suspension on which the lead wires are mounted is shifting to another type of suspension structure such that a plurality of conductor patterns are formed on the surface of the suspension.

To keep the head slider flying a microscopic height (about 50 to 100 nm) from the disk, a reduction in size of the head slider is effective. To maintain the following characteristics of the small-sized head slider to the wave motion of the magnetic disk, a reduction in stiffness of a flexure on which the head slider is mounted is effective. To this end, the size of the flexure must be reduced.

A recent magnetic disk drive has employed a composite head including a magnetoresistive element and a magnetic induction element as the transducer, so as to improve the performance of reading data recorded on the magnetic disk. The composite head has four terminals two terminals for the magnetic induction element and two terminals for the magnetoresistive element.

The head slider is mounted on the flexure formed integrally with the suspension at a front end portion thereof. The flexure is defined by a plurality of slits formed through the suspension, and has a pair of longitudinal beams. Accordingly, when the composite head slider is mounted on the flexure, two conductor patterns are formed in parallel on each longitudinal beam.

According to this method of mounting the composite head slider on the flexure, the sum of the widths of the two conductor patterns and the spacing between the two conductor patterns must be smaller than the width of each longitudinal beam of the flexure. However, the size reduction of the flexure in response to the size reduction of the magnetic head as mentioned above necessarily requires a reduction in width of each conductor pattern, causing a problem in electric resistance of each conductor pattern. That is, the reduction in width of each conductor pattern causes an increase in electric resistance of each conductor pattern. As a result, magnetic head noise in writing/reading data is increased to cause a deterioration in electromagnetic conversion characteristics.

Further, in the case where two or more conductor patterns, each being narrower than the conventional conductor pattern, are formed in parallel on each longitudinal beam of the flexure, the following problems occur.

(a) The spacing between the adjacent conductor patterns becomes narrower, so that magnetic head noise readily occurs.

(b) The adjacent conductor patterns possibly come into contact with each other, producing a defective magnetic head.

(c) A protective film formed on the conductor patterns possibly projects from the edge of each longitudinal beam or the like of the flexure, causing an increase in assembly error.

SUMMARY OF THE INVENTION

It is therefore an object of the present invention to provide a head assembly which can suppress the electric resistance of each conductor pattern even when the flexure is reduced in size and its longitudinal beam becomes narrow.

It is another object of the present invention to provide a head assembly which can respond to a reduction in size of a magnetic head by forming the conductor patterns on the suspension without an increase in stiffness of the flexure.

In accordance with an aspect of the present invention, there is provided a head assembly comprising a suspension; a flexure formed integrally with the suspension at a front end portion thereof; a head slider mounted on the flexure and having a transducer; a first conductor pattern formed on the suspension and the flexure, and having one end connected to the transducer; and a second conductor pattern laminated on the first conductor pattern with an insulator layer interposed therebetween, and having one end connected to the transducer.

In the case that the transducer is a composite head including a magnetic induction element and a magnetoresistive effect element, a third conductor pattern having one end connected to the transducer is formed on the suspension and the flexure, and a fourth conductor pattern having one end connected to the transducer is laminated on the third conductor pattern with an insulator layer interposed therebetween.

In accordance with another aspect of the present invention, there is provided a magnetic disk drive comprising a housing; a magnetic disk rotatably mounted in the housing and having a plurality of tracks; a transducer for reading/writing data on the magnetic disk; a head slider having one end portion formed with the transducer; a suspension for biasing the head slider toward the magnetic disk, the suspension having one end portion integrally formed with a flexure having a head slider mounting portion on which the head slider is bonded; a first conductor pattern formed on the suspension and having one end connected to the transducer; a second conductor pattern laminated on the first conductor pattern with an insulator layer interposed therebetween, and having one end connected to the transducer; and an actuator for moving the head slider mounted on the suspension across the tracks of the magnetic disk.

According to the present invention, the second conductor pattern is laminated on the first conductor pattern through the insulator layer. Accordingly, even when the flexure for mounting the head slider is partially reduced in width in response to a reduction in size of the head slider, a sufficient width of each conductor pattern can be ensured. As a result, the electric resistance of each conductor pattern can be sufficiently suppressed to thereby suppress the occurrence of magnetic head noise in reading/writing data, thus maintaining good electromagnetic conversion characteristics. Furthermore, since the conductor patterns can be formed on the suspension without an increase in stiffness of the flexure, the flying stability of the flying magnetic head can be improved.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 6 is an exploded perspective view of a third preferred embodiment of the present invention; and FIG. 7 is a cross section taken along the line C—C in FIG. 6.

DETAILED DESCRIPTION OF THE PREFERRED EMBODIMENTS

Figure 1:
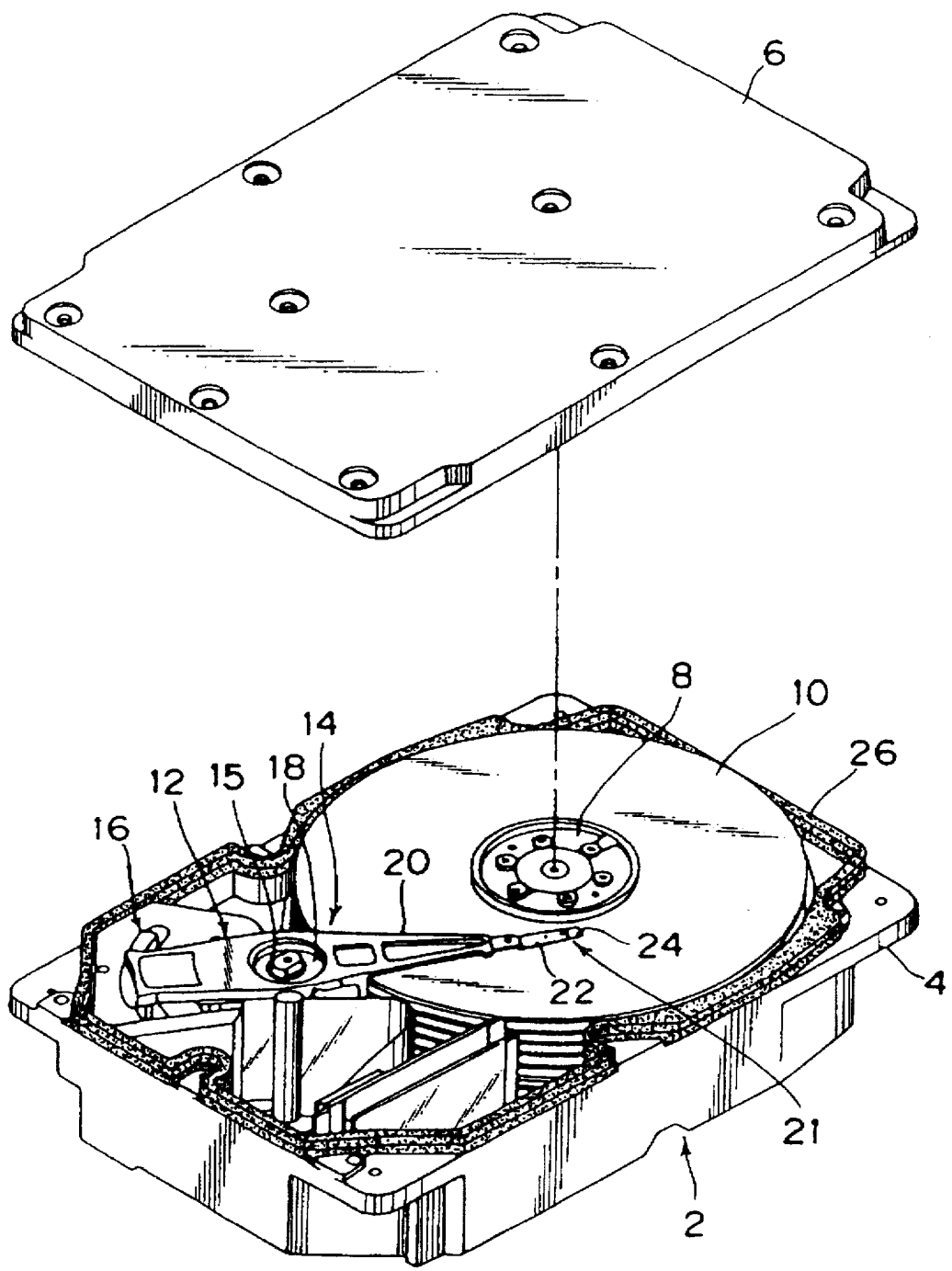
FIG. 1 is a perspective view of a magnetic disk drive including a head assembly according to the present invention.

Referring to FIG. 1, there is shown a perspective view of a magnetic disk drive having a head assembly according to the present invention. Reference numeral 2 denotes a housing (disk enclosure) composed of a base 4 and a cover 6. A spindle hub (not shown) is provided on the base 4 so as to be rotated by an inner hub motor (not shown). A plurality of magnetic disks 10 and spacers (not shown) are alternately stacked and mounted on the spindle hub. That is, the plurality of magnetic disks 10 are regularly spaced from each other by the spacers and are fixedly mounted on the spindle hub by securing a disk clamp 8 to the spindle hub by screws.

Reference numeral 12 denotes a rotary actuator composed of an actuator arm assembly 14 and a magnetic circuit 16. The actuator arm assembly 14 includes an actuator block 18 rotatably mounted on a shaft 15 fixed to the base 4. The actuator block 18 is integrally formed with a plurality of actuator arms 20 extending in one direction. A head assembly 21 is mounted at the front end of each actuator arm 20.

The head assembly 21 includes a suspension 22 fixed to the front end of each actuator arm 20 and a magnetic head slider 24 mounted on a front end portion of the suspension 22. An annular packing assembly 26 is provided on an outer peripheral portion of the base 4, and the cover 6 is secured by screws to the base 4 with the annular packing assembly 26 sandwiched therebetween, thereby sealing the housing 2 of the magnetic disk drive.

The head assembly 21 according to a first preferred embodiment of the present invention will now be described with reference to FIG. 2. The suspension 22 is formed of stainless steel. The suspension 22 is bent at its transversely opposite end portions 22a and 22b to increase stiffness. The front end portion of the suspension 22 is integrally formed with a flexure 30. The flexure 30 has a head slider mounting portion 36 defined by a U-shaped slit 32 and an inverted U-shaped slit 34 opposed to the U-shaped slit 32.

A first beam 40 is defined by the U-shaped slit 32, the inverted U-shaped slit 34, and a first longitudinal slit 38 formed on one transversely outer side of these slits 32 and 34. Similarly, a second beam 44 is defined by the U-shaped slit 32, the inverted U-shaped slit 34, and a second longitudinal slit 42 formed on the other transversely outer side of these slits 32 and 34. A first bridge 46 is so formed as to connect the head slider mounting portion 36 and the first beam 40, and a second bridge 48 is so formed as to connect the head slider mounting portion 36 and the second beam 44.

The head slider 24 is integrally formed at its one end with a magnetic induction element 50 and a magnetoresistive element 52 as transducers. The magnetic induction element 50 is connected to a pair of terminals 54, and the magnetoresistive element 52 is connected to a pair of terminals 56. On the other hand, a pair of terminals 58 corresponding to the pair of terminals 54 and a pair of terminals 60 corresponding to the pair of terminals 56 are formed on the head slider mounting portion 36 of the flexure 30 through an insulator layer. The head slider 24 is bonded to the head slider mounting portion 36 of the flexure 30, and the terminals 54 and 56 of the head slider 24 are respectively connected to the terminals 58 and 60 of the head slider mounting portion 35 by bonding with gold balls.

Figure 2:
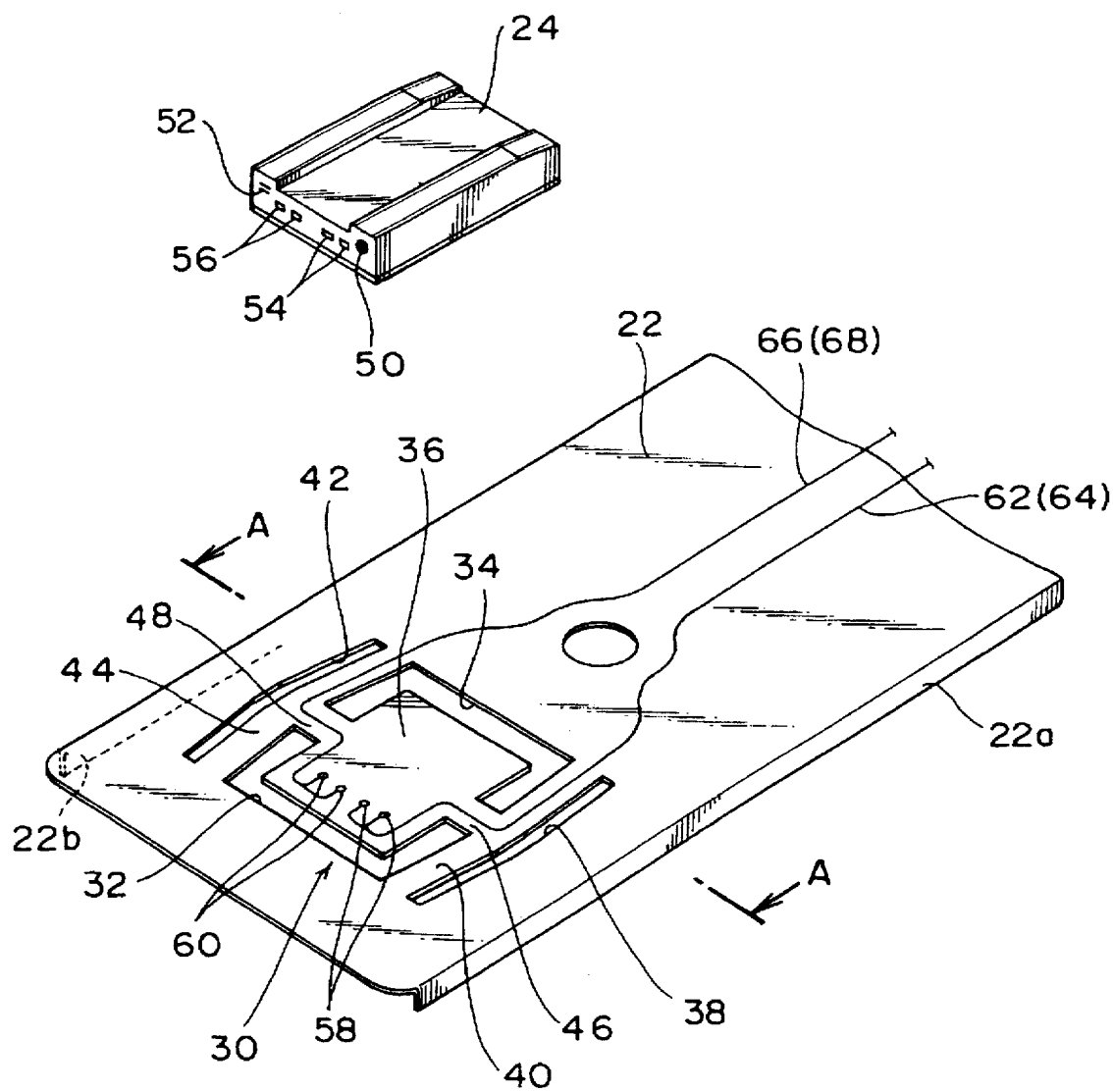
FIG. 2 is an exploded perspective view of a first preferred embodiment of the present invention.
Figure 3A:
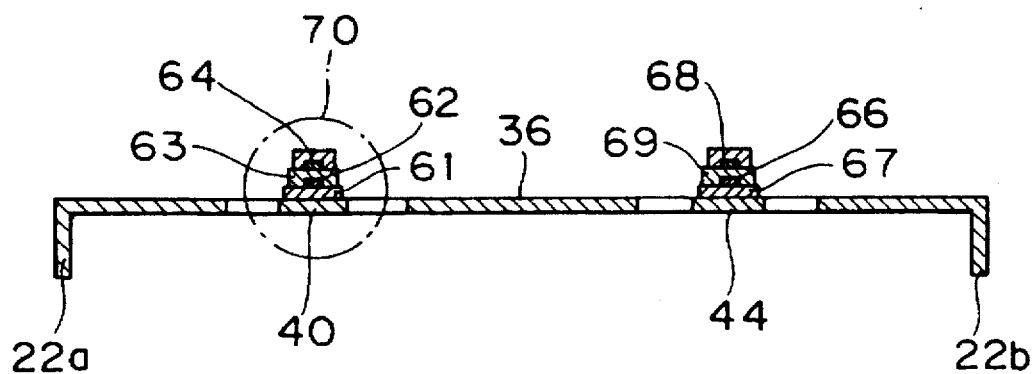
FIG. 3A is a cross section taken along the line A—A in FIG. 2.

As shown in FIG. 3A which is a cross section taken along the line A—A in FIG. 2, a conductor pattern 62 having one end connected to one of terminals 58 is formed on the suspension 22 and the flexure 30 through an insulator layer 61, and a conductor pattern 64 having one end connected to the other of the terminals 58 is laminated on the conductor pattern 62 through an insulator layer 63. Similarly, a conductor pattern 66 having one end connected to one of the terminals 60 is formed on the suspension 22 and the flexure 30 through an insulator layer 67, and a conductor pattern 68 having one end connected to the other of the terminals 60 is laminated on the conductor pattern 66 through an insulator layer 69.

Figure 3B:
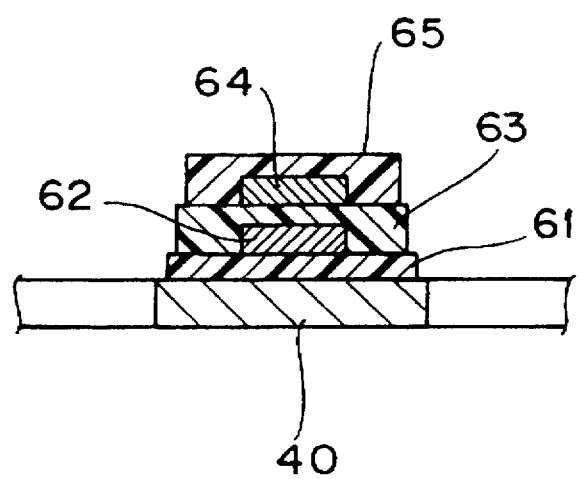
FIG. 3B is an enlarged view of an encircled portion 70 in FIG. 3A.

A laminating method for the conductor patterns 62 and 64 will be described with reference to FIG. 3B which is an enlarged view of an encircled portion 70 in FIG. 3A. The insulator layer 61 of polyimide is first formed on the first beam 40. The conductor pattern 62 is next formed on the insulator layer 61 by sputtering Cu and then etching this sputtered film. The insulator layer 63 of polyimide is next formed so as to fully cover the conductor pattern 62. The conductor pattern 64 is next formed on the insulator layer 63 by sputtering Cu and then etching this sputtered film. Finally, a protective layer 65 of polyimide is formed so as to fully cover the conductor pattern 64. Although not shown, the conductor patterns 66 and 68 are formed by a laminating method similar to that for the conductor patterns 62 and 64.

Each of the insulator layers 61 and 63 and the protective layer 65 has a thickness ranging from 0.5 to 20 μm, preferably, from 1 to 10 μm. While the conductor patterns 62, 64, 66, and 68 are formed preferably of Cu, other conductive materials such as Au, Al, Ag, W, and Ta may be adopted. Each of the conductor patterns 62 to 68 has a thickness ranging from 1 to 10 μm, preferably, from 2 to 8 μm.

The smaller the size of the head slider 24, the smaller the size of the flexure 30 for mounting the head slider 24. Further, the thickness of each of the beams 40 and 44 of the flexure 30 has reached a minimum value (20 μm) at present. Therefore, to reduce the size of the flexure 30, the width of each of the beams 40 and 44 must be reduced. From this viewpoint, it is advantageous that the conductor patterns 62 and 66 each having an enough width are respectively formed on the narrow beams 40 and 44, and the conductor patterns 64 and 68 each having an enough width are respectively formed on the conductor patterns 62 and 66 according to the first preferred embodiment. With this arrangement, these conductor patterns 62 to 68 can be formed on the suspension 22 and the flexure 30 with the electric resistance of each conductor pattern being reduced.

Figure 4:
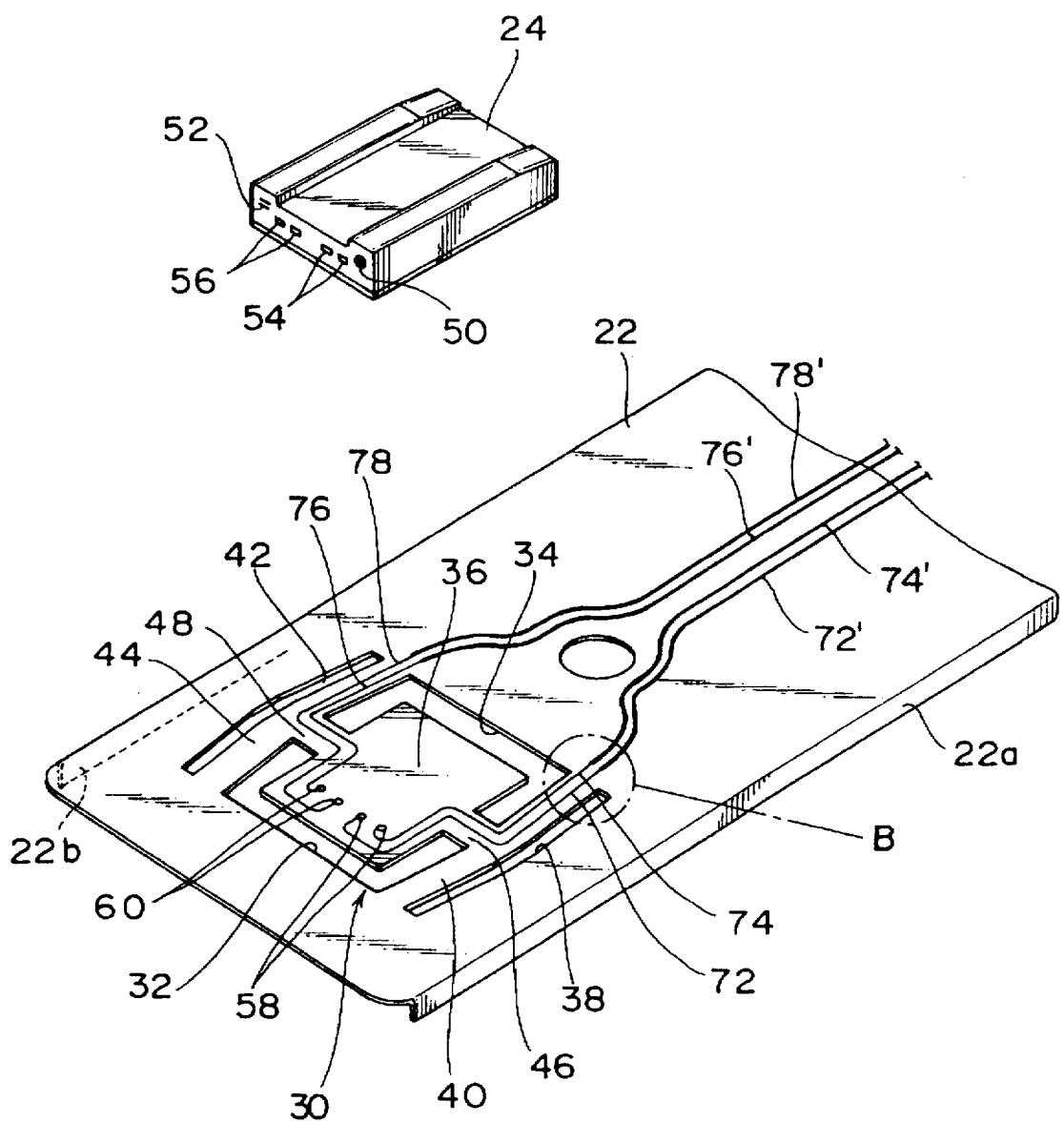
FIG. 4 is an exploded perspective view of a second preferred embodiment of the present invention.

Referring to FIG. 4, there is shown an exploded perspective view of a second preferred embodiment of the present invention. Substantially the same parts as those in the first preferred embodiment will be denoted by the same reference numerals, and the description thereof will be omitted to avoid repetition. In the second preferred embodiment, a pair of narrow conductor patterns 72 and 74 are formed in the same horizontal plane through an insulator layer on a flexure 30, and are respectively connected to a pair of terminals 58. Similarly, a pair of narrow conductor patterns 76 and 78 are formed in the same horizontal plane through an insulator layer on the flexure 30, and are respectively connected to a pair of terminals 60. Further, a pair of conductor patterns 72' and 74' wider than the conductor patterns 72 and 74 are formed in the same horizontal plane through an insulator layer on a suspension 22, and are respectively connected to the conductor patterns 72 and 74. Similarly, a pair of conductor patterns 76' and 78' wider than the conductor patterns 76 and 78 are formed in the same horizontal plane through an insulator layer on the suspension 22, and are respectively connected to the conductor patterns 76 and 78.

Figure 5:
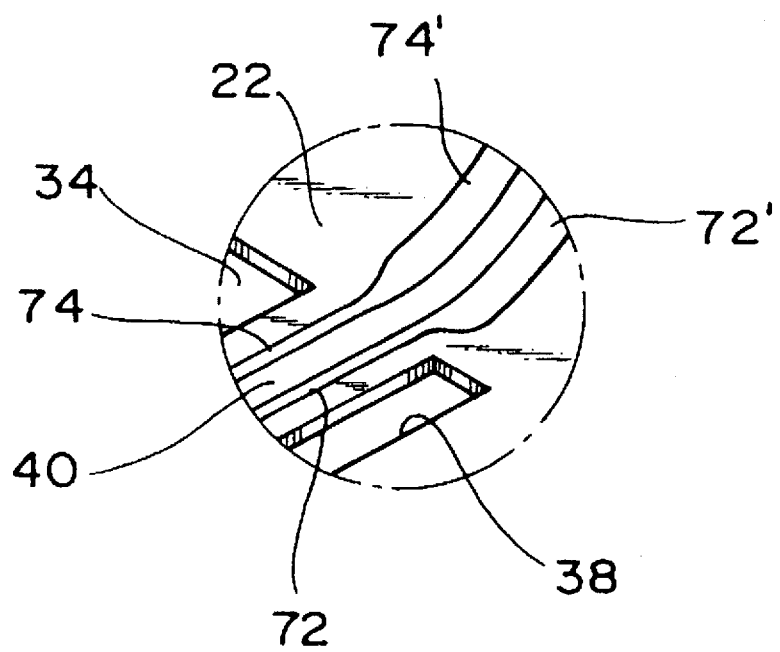
FIG. 5 is an enlarged view of an encircled portion B in FIG. 4.

As shown in FIG. 5 which is an enlarged view of an encircled portion B in FIG. 4, the narrow conductor patterns 72 and 74 are respectively connected to the wide conductor patterns 72' and 74' preferably at a portion of the suspension 22 near the junction between the suspension 22 and a beam 40 of the flexure 30. Although not shown, the narrow conductor patterns 76 and 78 are respectively connected to the wide conductor patterns 76' and 78' preferably at a portion of the suspension 22 near the junction between the suspension 22 and a beam 44 of the flexure 30. According to this preferred embodiment, each pair of narrow conductor patterns formed on the flexure 30 are respectively connected to each pair of wide conductor patterns formed on the suspension 22, thereby suppressing an increase in electric resistance of each connected conductor patterns to some extent and accordingly suppressing the occurrence of magnetic head noise in reading/writing data.

Referring to FIG. 6, there is shown an exploded perspective view of a third preferred embodiment of the present invention. In this preferred embodiment, a suspension 80 of stainless steel is integrally formed at its front end with a flexure 82. The flexure 82 has a head slider mounting portion 86 defined by a C-shaped slit 84. A pair of longitudinal beams 88 and 90 are formed on the transversely opposite outer sides of the C-shaped slit 84. The longitudinal beams 88 and 90 are connected together at their front ends by a transverse beam 92. The transverse beam 92 is connected to the head slider mounting portion 86 by a bridge 94. A pair of terminals 96 and a pair of terminals 98 are formed on the head slider mounting portion 86 through an insulator layer. The pair of terminals 96 are respectively connected by bonding to a pair of terminals 54 of a head slider 24, and the pair of terminals 98 are respectively connected by bonding to a pair of terminals 56 of the head slider 24.

As shown in FIG. 7 which is a cross section taken along the line C—C in FIG. 6, a pair of shallow grooves 108 and 110 are formed by etching on the suspension 80 and the flexure 82. An insulator layer 99 of polyimide is formed in the groove 108, and a conductor pattern 100 is formed on the insulator layer 99. An insulator layer 101 of polyimide is further formed in the groove 108 so as to fully cover the conductor pattern 100 and fill the groove 108, and a conductor pattern 102 is formed on the insulator layer 101. The conductor pattern 102 is fully covered with a protective layer 103 of polyimide. Similarly, conductor patterns 104 and 106 are laminated through insulator layers by utilizing the groove 110.

In constructing the head assembly according to this preferred embodiment, the base end portion of the suspension 80 is curved toward a disk 10 facing thereto, so as to obtain resiliency in a direction where the head slider 24 biases the disk 10, and the transversely opposite end portions of the suspension 80 are bent to form ribs, so as to obtain stiffness. Thereafter, a spacer for connecting the suspension 80 to the corresponding arm 20 is spot-welded by laser to the base end portion of the suspension 80, and the head slider 24 is bonded to the head slider mounting portion 86 of the flexure 82 by adhesive.

According to this preferred embodiment, the conductor patterns 100 and 102 are laminated in the shallow groove 108, and the conductor patterns 104 and 106 are laminated in the shallow groove 110. Accordingly, in branching the conductor patterns 100 and 102 near the terminal 96 and branching the conductor patterns 104 and 106 near the terminal 98, these conductor patterns can be easily formed. Although FIG. 7 shows that the upper surfaces of the conductor patterns 102 and 106 are higher in level than the upper surface of the suspension 80, the depths of the grooves 108 and 110 may be suitably set according to the thickness of the suspension 80 and the thicknesses of the conductor patterns 102 and 106 in such a manner that the upper surfaces of the conductor patterns 102 and 106 may be lower in level than the upper surface of the suspension 80, or may be flush with the upper surface of the suspension 80.

As shown in FIG. 6, the four conductor patterns 100 to 106 are not laminated at the base end portion of the suspension 80, but are formed in the same horizontal plane through an insulator layer on the suspension 80. After connecting the suspension 80 and the arm 20 through the spacer by crimping, the four conductor patterns 100 to 106 are connected to four terminals of a flexible printed circuit sheet (FPC) by direct bonding or by lead wires.

As described above, according to the present invention, even when the size of the flexure for mounting the head slider becomes small in response to a reduction in size of the head slider, the plural conductor patterns can be easily formed on the suspension and the flexure without an increase in electric resistance of the conductor patterns. Accordingly, the flying stability of the head slider can be improved without the need for increasing the stiffness of the flexure.

What is claimed is:

1. A head assembly comprising:

a suspension;

a flexure formed integrally, with said suspension at a front end portion thereof;

a head slider having a transducer mounted on said flexure;

a first conductor pattern formed on said suspension and said flexure, said first conductor pattern having one end connected to said transducer; and a second conductor pattern laminated on said first conductor pattern with an insulator layer interposed therebetween, said second conductor pattern having one end connected to said transducer.

2. A head assembly according to claim 1, wherein said flexure includes a head slider mounting portion defined by a U-shaped slit and an inverted U-shaped slit opposed to said U-shaped slit; a first beam defined by said U-shaped slit, said inverted U-shaped slit, and a first longitudinal slit formed on one transversely outer side of said U-shaped slit and said inverted U-shaped slit; a second beam defined by said U-shaped slit, said inverted U-shaped slit, and a second longitudinal slit formed on the other transversely outer side of said U-shaped slit and said inverted U-shaped slit; a first bridge connecting said head slider mounting portion and said first beam; and a second bridge connecting said head slider mounting portion and said second beam.

3. A head assembly according to claim 2, further comprising:

a third conductor pattern formed on said suspension and said flexure, said third conductor pattern having one end connected to said transducer; and a fourth conductor pattern laminated on said third conductor pattern with an insulator layer interposed therebetween, said fourth conductor pattern having one end connected to said transducer;

wherein said transducer includes a writing element and a reading element; and said first and second conductor patterns are formed on said first bridge and said first beam, and said third and fourth patterns are formed on said second bridge and said second beam.

4. A head assembly according to claim 3, wherein said suspension and said flexure have first and second grooves formed by etching, said first conductor pattern being formed in said first groove, and said third conductor pattern being formed in said second groove.

5. A head assembly according to claim 1, wherein said flexure includes a head slider mounting portion defined by a C-shaped slit; a first and a second longitudinal beams formed on transversely opposite outer sides of said C-shaped slit; a transverse beam connecting said first and second longitudinal beams; and a bridge connecting said head slider mounting portion and said transverse beam.

6. A head assembly according to claim 5, further comprising:

a third conductor pattern formed on said suspension and said flexure, said third conductor pattern having one end connected to said transducer; and a fourth conductor pattern laminated on said third conductor pattern with an insulator layer interposed therebetween, said fourth conductor pattern having one end connected to said transducer;

wherein said transducer includes a writing element and a reading element; and said first and second conductor patterns are formed on said first longitudinal beam, and said third and fourth conductor patterns are formed on said second longitudinal beam.

7. A head assembly according to claim 6, wherein said suspension and said flexure have first and second grooves formed by etching, said first conductor pattern being formed in said first groove, and said third conductor pattern being formed in said second groove.

8. A head assembly comprising:

a suspension;

a flexure formed integrally with said suspension at a front end portion thereof;

a head slider mounted on said flexure, said head slider having a writing element and a reading element;

first and second conductor patterns formed on said suspension and said flexure, each of said first and second conductor patterns having one end connected to said writing element; and third and fourth conductor patterns formed on said suspension and said flexure, each of said third and fourth conductor patterns having one end connected to said reading element;

wherein said flexure includes a head slider mounting portion defined by a U-shaped slit and an inverted U-shaped slit opposed to said U-shaped slit; a first beam defined by said U-shaped slit, said inverted U-shaped slit, and a first longitudinal slit formed on one transversely outer side of said U-shaped slit and said inverted U-shaped slit; a second beam defined by said U-shaped slit, said inverted U-shaped slit, and a second longitudinal slit formed on the other transversely outer side of said U-shaped slit and said inverted U-shaped slit; a first bridge connecting said head slider mounting portion and said first beam; and a second bridge connecting said head slider mounting portion and said second beam;

wherein said first and second conductor patterns pass through said first bridge and said first beam, and each of said first and second conductor patterns formed on at least said first bridge and said first beam has a width smaller than that of each of said first and second conductor patterns formed on said suspension and said flexure except at least said first bridge and said first beam; and wherein said third and fourth conductor patterns pass through said second bridge and said second beam, and each of said third and fourth conductor patterns formed on at least said second bridge and said second beam has a width smaller than that of each of said third and fourth conductor patterns formed on said suspension and said flexure except at least said second bridge and said second beam.

9. A head assembly comprising:

a suspension;

a flexure formed integrally with said suspension at a front end portion thereof;

a head slider mounted on said flexure, said head slider having a writing element and a reading element;

first and second conductor patterns formed on said suspension and said flexure, each of said first and second conductor patterns having one end connected to said writing element; and third and fourth conductor patterns formed on said suspension and said flexure, each of said third and fourth conductor patterns having one end connected to said reading element;

wherein said flexure includes a head slider mounting portion defined by a C-shaped slit; first and second longitudinal beams formed on transversely opposite outer sides of said C-shaped slit; a transverse beam connecting said first and second longitudinal beams; and a bridge connecting said head slider mounting portion and said transverse beam;

wherein said first and second conductor patterns pass through said first longitudinal beam, said transverse beam, and said bridge; and said third and fourth conductor patterns pass through said second longitudinal beam, said transverse beam, and said bridge; and wherein each of said first to fourth conductor patterns formed on at least said first and second longitudinal beams, said transverse beam, and said bridge has a width smaller than that of each of said first to fourth conductor patterns formed on said suspension and said flexure except at least said first and second longitudinal beams, said transverse beam, and said bridge.

10. A magnetic disk drive comprising:

a housing;

a magnetic disk rotatably mounted in said housing and having a plurality of tracks;

a transducer for reading/writing data on said magnetic disk;

a head slider having one end portion formed with said transducer;

a suspension for biasing said head slider toward said magnetic disk, said suspension having one end portion integrally formed with a flexure having a head slider mounting portion on which said head slider is bonded;

a first conductor pattern formed on said suspension and having one end connected to said transducer;

a second conductor pattern laminated on said first conductor pattern with an insulator layer interposed therebetween, and having one end connected to said transducer; and an actuator for moving said head slider mounted on said suspension across said tracks of said magnetic disk.

11. A magnetic disk drive according to claim 10, further comprising:

a third conductor pattern formed on said suspension and having one end connected to said transducer; and a fourth conductor pattern laminated on said third conductor pattern with an insulator layer interposed therebetween, and having one end connected to said transducer;

wherein said transducer includes a writing element and a reading element; and said first and second conductor patterns are connected to said writing element, and said third and fourth conductor patterns are connected to said reading element.

12. A suspension for a head slider comprising:

a flexure formed integrally with said suspension at a front end portion thereof;

a first conductor pattern formed on said suspension and said flexure; and a second conductor pattern laminated on said first conductor pattern with an insulator layer interposed therebetween.

13. A suspension for a head slider comprising:

a flexure formed integrally with said suspension at a front end portion thereof;

first and second conductor patterns formed on said suspension and said flexure; and third and fourth conductor patterns formed on said suspension and said flexure;

wherein flexure includes a head slider mounting portion defined by a U-shaped slit and an inverted U-shaped slit opposed to said U-shaped slit; a first beam defined by said U-shaped slit, said inverted U-shaped slit, and a first longitudinal slit formed on one transversely outer side of said U-shaped slit and said inverted U-shaped slit; a second beam defined by said U-shaped slit, said inverted U-shaped slit, and a second longitudinal slit formed on the other transversely outer side of said U-shaped slit and said inverted U-shaped slit; a first bridge connecting said head slider mounting portion and said first beam; and a second bridge connecting said head slider mounting portion and said second beam;

wherein said first and second conductor patterns pass through said first bridge and said first beam, and each of said first and second conductor patterns formed on at least said first bridge and said first beam has a width smaller than that of each of said first and second conductor patterns formed on said suspension and said flexure except at least said first bridge and said first beam; and wherein said third and fourth conductor patterns pass through said second bridge and said second beam, and each of said third and fourth conductor patterns formed on at least said second bridge and said second beam has a width smaller than that of each of said third and fourth conductor patterns formed on said suspension and said flexure except at least said second bridge and said second beam.

14. A suspension for a head slider comprising:

a flexure formed integrally with said suspension at a front end portion thereof;

first and second conductor patterns formed on said suspension and said flexure; and third and fourth conductor patterns formed on said suspension and said flexure;

wherein said flexure includes a head slider mounting portion defined by a C-shaped slit; first and second longitudinal beams formed on transversely opposite outer sides of said C-shaped slit; a transverse beam connecting said first and second longitudinal beams; and a bridge connecting said head slider mounting portion and said transverse beam;

wherein said first and second conductor patterns pass through said first longitudinal beam, said transverse beam, and said bridge; and said third and fourth conductor patterns pass through said second longitudinal beam, said transverse beam, and said bridge; and wherein each of said first to fourth conductor patterns formed on at least said first and second longitudinal beams, said transverse beam, and said bridge has a width smaller than that of each of said first to fourth conductor patterns formed on said suspension and said flexure except at least said first and second longitudinal beams, said transverse beam, and said bridge.

* * * * *